United States Patent
Gupta et al.

(10) Patent No.: US 7,506,303 B2
(45) Date of Patent: Mar. 17, 2009

(54) SYSTEM AND METHOD FOR UTILIZING NON-EMF BASED OBJECTS IN AN EMF ENVIRONMENT

(75) Inventors: Titania M. Gupta, Hawthorne, NY (US); Laurent D. Hasson, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 908 days.

(21) Appl. No.: 11/033,772

(22) Filed: Jan. 12, 2005

(65) Prior Publication Data

US 2006/0156277 A1 Jul. 13, 2006

(51) Int. Cl.
*G06F 9/45* (2006.01)

(52) U.S. Cl. ...................................... 717/104
(58) Field of Classification Search .................. 717/104
See application file for complete search history.

(56) References Cited

U.S. PATENT DOCUMENTS

| | | |
|---|---|---|
| 6,560,769 B1 | 5/2003 | Moore et al. |
| 2002/0073091 A1 | 6/2002 | Jain et al. |
| 2002/0129052 A1 | 9/2002 | Glazer et al. |
| 2003/0131014 A1 | 7/2003 | Brinkmoeller et al. |
| 2003/0167456 A1 | 9/2003 | Sabharwal |
| 2004/0006549 A1 | 1/2004 | Mullins et al. |
| 2004/0015829 A1 | 1/2004 | Mullins et al. |
| 2004/0015834 A1 | 1/2004 | Mestre et al. |
| 2004/0015840 A1 | 1/2004 | Walker |
| 2004/0049776 A1 | 3/2004 | Fomenko et al. |
| 2005/0188353 A1* | 8/2005 | Hasson et al. ................ 717/116 |
| 2006/0064667 A1* | 3/2006 | Freitas ........................ 717/104 |
| 2006/0101379 A1* | 5/2006 | Hussey ........................ 717/104 |
| 2006/0235882 A1* | 10/2006 | Mateescu et al. .......... 707/104.1 |
| 2008/0010629 A1* | 1/2008 | Berg et al. ................... 717/116 |

* cited by examiner

*Primary Examiner*—John Chavis
(74) *Attorney, Agent, or Firm*—Andre Gibbs; Hoffman Warnick LLC

(57) ABSTRACT

A system, method and program product for generating artifacts that can convert back and forth between non-EMF (Eclipse Modeling Framework) objects and EMF-based objects in an EMF-based runtime environment such as Web Data Objects (WDO) or Service Data Objects (SDO). Included is a system for inputting one or more non EMF application classes such as Java Beans and generating artifacts that include: a source meta model (ecore) that describes the data model defined by the input application classes; an EMap file that contains mappings between the classes and properties of the non-EMF objects and the EMF Objects; a target meta model (ecore) which represents the source meta model as transformed by the emap mappings; and a set of java classes (Mediators and DiffHandlers) that will at runtime perform the transformation between the two environments (non-EMF and EMF based objects).

3 Claims, 3 Drawing Sheets

SYSTEM AND METHOD FOR UTILIZING NON-EMF BASED OBJECTS IN AN EMF ENVIRONMENT

BACKGROUND OF THE INVENTION

1. Technical Field

The present invention relates generally to Eclipse Modeling Framework (EMF) based systems, and more specifically relates to a system and method that allows arbitrary Java classes comprised of non-EMF objects to be used in an EMF environment.

2. Related Art

Eclipse Modeling Framework (EMF) is a modeling framework and code generation facility for building tools and other applications based on a structured data model. In EMF based systems, application objects are formally modeled using XMI (XML Metadata Interchange) files written in XML (eXtensible Markup Language) that describe the class attributes and relationships between objects. EMF allows the formal modeling concepts to take on real software form (as Java classes) right in the application space utilizing EObjects and EClasses. However, this also requires the application to be EMF based. Since EMF technology is fairly new, it can be used only with new EMF-based applications, not existing non-EMF-based applications. A problem that arises is how to introduce formal modeling in applications that are based on traditional Java classes, not EMF's EObjects and EClasses.

WDOs (Web Data Objects), and more recently, SDOs (Service Data Objects) are based on EMF. SDO is a framework that simplifies and unifies data application development in a service oriented architecture (SOA). It supports and integrates XML and incorporates J2EE patterns and best practices.

Currently, there exists no solution to the problem of how to introduce EMF-based modeling in applications that are based on traditional Java classes. Accordingly, a need exists for a system and method that would allow EMF based frameworks such as SDO and WDO to be used with existing non-EMF-based Java applications.

SUMMARY OF THE INVENTION

The present invention addresses the above-mentioned problems, as well as others, by providing a system and method that allows EMF based frameworks such as SDO and WDO to be used with existing non-EMF-based Java applications. In order to use arbitrary java classes that are non-EMF based in an EMF based environment (such as WDO and SDO), specialized Mediators and DiffHandlers are generated to convert these non-EMF objects to EMF-objects at runtime. While Mediators perform the conversion from the non-EMF objects to the EMF objects, DiffHandlers perform synchronization of changes made to the EMF objects that need to be persisted in the non-EMF application. The invention accomplishes this task by providing the user with: a process to create a source meta model (ecore) that describes the data model defined by the input non-EMF application classes; a process to create an identity EMap file that contains mappings between the classes and properties of the input non-EMF classes and the EMF Objects specified by the generated source meta model; a process to create a target meta model (ecore) which represents the source meta model as transformed by the EMap mappings; and a process to generate a set of java classes (Mediators and DiffHandlers) that will at runtime perform the transformation between the two environments (non-EMF and EMF based objects).

In a first aspect, the invention provides a system for generating a target meta model file (target ecore) that can convert non-EMF objects to EMF-based objects in an EMF-based runtime environment, comprising: a system for inputting a source meta model that describes a data model and runtime support for the data model; a system for inputting an EMap file that maps non-EMF java classes to the source meta model; and an association mechanism that utilizes the Emap file to associate eClassifiers in the source meta model to non-EMF Java classes in the source meta model.

In a second aspect, the invention provides a program product stored on a computer readable medium for generating a target meta model file that can convert non-EMF objects to EMF-based objects in an EMF-based runtime environment, comprising: program code configured for inputting a source meta model that describes a data model and runtime support for the data model; program code configured for inputting an EMap file that maps non-EMF java classes to the source meta model; and program code configured for utilizing the Emap file to associate eClassifiers in the source meta model to non-EMF Java classes in the source meta model.

In a third aspect, the invention provides a method for generating a target meta model file that can convert non-EMF objects to EMF-based objects in an EMF-based runtime environment, comprising: inputting a source meta model that describes a data model and runtime support for the data model; inputting an EMap file that maps non-EMF java classes to the source meta model; and utilizing the Emap file to associate eClassifiers in the source meta model to non-EMF Java classes in the source meta model.

In a fourth aspect, the invention provides a method for generating a target meta model file that can convert non-EMF objects to EMF-based objects in an EMF-based runtime environment, comprising: providing a computer infrastructure being operable to: input a source ecore that describes a data model and runtime support for the data model; input an EMap file that maps non-EMF java classes to the source ecore; and utilize the Emap file to associate eClassifiers in the source ecore to non-EMF Java classes in the source ecore.

In a fifth aspect, the invention provides computer software embodied in a propagated signal for generating a target meta model file that can convert non-EMF objects to EMF-based objects in an EMF-based runtime environment: the computer software comprising instructions to cause a computer to perform the following functions: input a source ecore that describes a data model and runtime support for the data model; input an EMap file that maps non-EMF java classes to the source ecore; and utilize the Emap file to associate eClassifiers in the source ecore to non-EMF Java classes in the source ecore.

Accordingly, the invention allows specifying the mapping between the source java classes and the target EMF EClasses by the use of an EMap XML file. The attributes of each java class are mapped to the appropriate "EStructuralFeature" of its corresponding EClass. Also provided is the additional functionality of adding "calculated attributes" to the EClass that were not part of the original java class by allowing the developer to specify an expression to be evaluated at runtime. The EMap uses a simple XML schema that anyone with basic knowledge of XML will be able to follow. Since the EMap is written in XML, it is extensible, and the developer using our invention will be able to further customize the EMF/SDO/WDO conversion by extending the EMap (and providing the appropriate extended conversion logic).

The invention further provides the user with a utility that can create an identity EMap (a one-to-one mapping) given an EMF/SDO/WDO model (i.e., an XMI file having an ".ecore"

extension), and optional parameters describing the accessor methods used for the attributes of the java classes. When the optional parameters are missing, it is assumed that the java classes follow the JavaBeans coding standards. Although manually creating an EMap would be a fairly simple and straightforward task, the user has the option to use the identity EMap generation tool instead. The user can then modify this identity EMap if needed. This further simplifies the process of mapping, with the added benefit of reducing human errors in the EMap.

The invention uses the mapping information in the EMap XML file, together with the source ecore to automatically generate Mediators and DiffHandlers that can convert non-EMF java objects in the source system to EMF-based EObjects in the target system at runtime.

Based on the source EMF/SDO/WDO meta-model (ecore), and the mappings specified in the EMap, the invention can then automatically generate the target EMF/SDO/WDO meta-model (ecore). The target ecore is needed to serialize and deserialize data objects created in the target sub-system. Although the ecore can be coded by hand, in most cases, the ecore is generated by tooling provided by the EMF framework. Coding the target ecore manually may be error prone and cumbersome and a thorough knowledge of the complicated ecore schema is required. The present invention provides a simple yet powerful tool for the developer to create the target ecore automatically.

BRIEF DESCRIPTION OF THE DRAWINGS

These and other features of this invention will be more readily understood from the following detailed description of the various aspects of the invention taken in conjunction with the accompanying drawings in which.

DETAILED DESCRIPTION OF THE INVENTION

Overview

As noted above, Eclipse Modeling Framework (EMF) is an open source project that provides a modeling framework and code generation facility for building tools and other applications based on a structured data model. The core EMF framework includes a meta model (referred to as "ecore" or "ecore model") for describing data models and runtime support for the data models including change notification, persistence support with default XMI serialization, and a reflective API for manipulating EMF objects generically. The ecore model describes a data model in terms of eClassifiers and eStructuralFeatures (eAttributes, and eReferences). The corresponding EMF runtime objects are called EObjects.

Service Data Objects (SDOs) are designed to simplify and unify the way in which applications handle data. Using SDO, application programmers can uniformly access and manipulate data from heterogeneous data sources, including relational databases, XML data sources, Web services, and enterprise information systems. The basic data model of an SDO is a graph with an associated schema. The SDO schema is described using the ecore meta-model from EMF; however, the SDO runtime objects are called DataObjects. Web Data Objects (WDOs) are IBM's precursor to SDO and are very similar. Accordingly, while the invention is described below in terms of SDOs, it should be understood that the invention may also be applied to EMF, WDOs and/or any other EMF-based frameworks.

In an EMF-based application, the information in the ecore is used to generate "EClasses" and other related meta-info to represent the objects in the ecore. The equivalent runtime objects are EObjects. Eclipse Modeling Framework cannot be used directly with existing java classes that are not EClasses without rewriting the application to be EMF-based. Aside from the cost of such a rewrite, the source of the original java classes may no longer be available, and only the compiled classes are available to work with. The present invention allows existing non-EMF java classes to be used in EMF systems. In order to use non-EMF java classes in an EMF environment, one would need to generate an EMF meta-model (i.e., an XMI file with an ".ecore" extension).

System Overview

Figure 1:
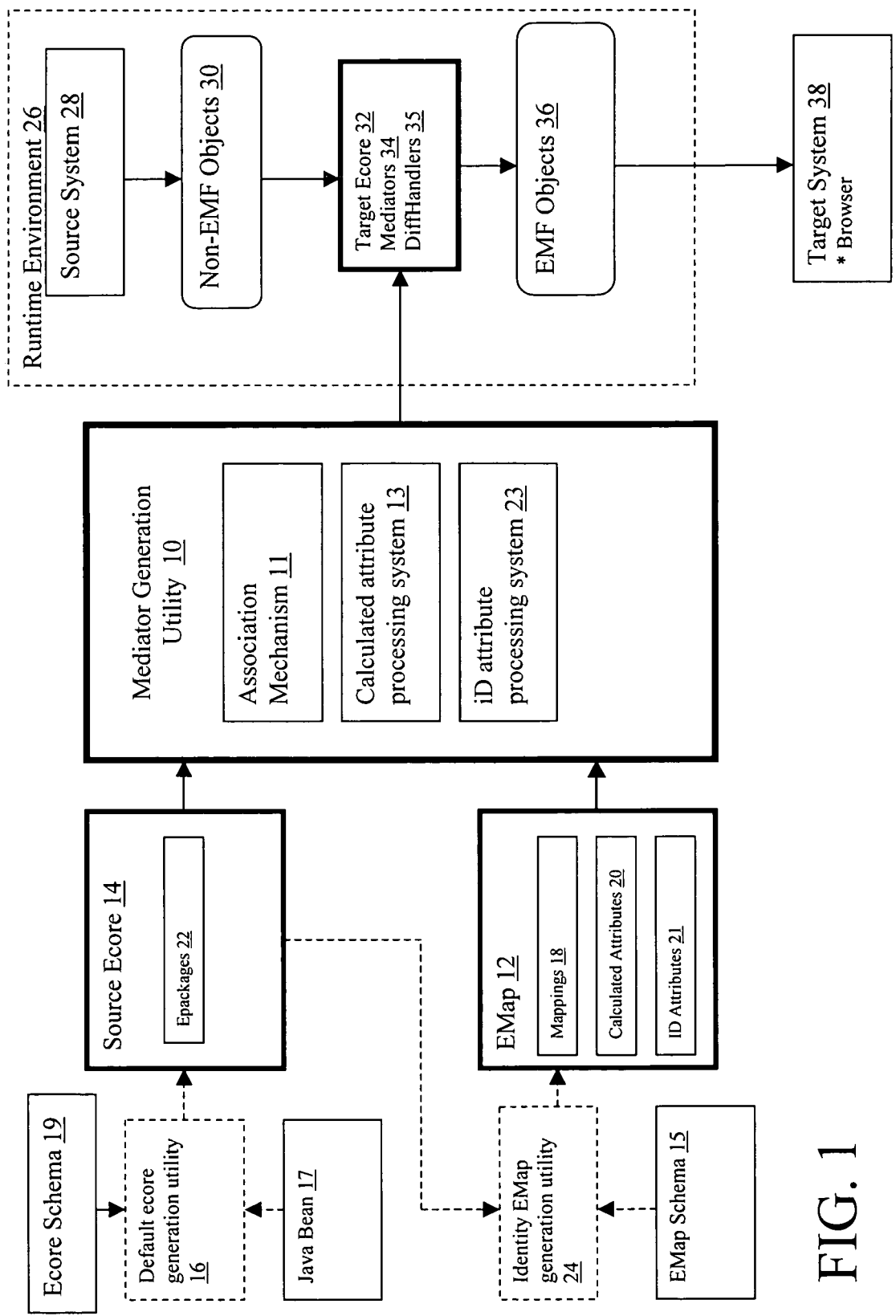
FIG. 1 depicts a system overview of a process for creating a target ecore that can be used in an EMF based runtime environment in accordance with the present invention.

Referring now to FIG. 1, an overview of a system incorporating the present invention is shown. Central to the invention is a mediator generation utility 10 that converts a source ecore 14 to a target ecore 32. As described below, mediator generation utility 10 accomplishes this task by inputting source ecore 14 and an EMap file 12 ("EMap"). Once created, the target ecore 32 is used by the generated Mediators 34 and DiffHandlers 35 to convert non-EMF objects 30 from a source system 28 into EMF objects 36 (e.g., EObjects) for a target system 38 (e.g., a browser) in an EMF runtime environment 26.

The source ecore 14 can be generated in any manner, e.g., obtained from an XML schema model, relational meta-data and other sources such as UML (Unified Modeling Language) class diagrams, hand-coded, etc. Alternatively, a default source ecore may be automatically generated by default ecore generator utility 16 based on a conventional Java Bean 17. One skilled in the art could readily implement such an automated process.

EMap file 12 is an XML file that provides mappings 18, which map the non-EMF java classes to the source ecore 14. EMap file 12 may also include expressions comprised of calculated attributes 20, which are neither part of the original java class nor the ecore meta-model. The developer can specify such expressions to be evaluated at runtime. EMap file 12 can likewise be generated in any manner, e.g., by hand, etc. Identity EMap generator utility 24 may be utilized to automatically create an "identity" EMap based on the source ecore 14 and an EMap schema 15. The generation of an identity EMap in this manner is a straightforward process which one skilled in the art could readily implement programmatically.

As noted, mediator generation utility 10 generates the target ecore 32 based on the meta-model (source ecore 14) and the EMap file 12 for an existing application. In order to generate the target ecore 32, mediator generation utility 10 includes an association mechanism 11 that associates the eClassifiers in the source ecore 14 to its source non-EMF java classes by means of the EMap file 12. Mediator generation utility 10 then creates specific Mediators 34 and DiffHandlers 35 that automatically convert the non-EMF java objects 30 into SDO-based EObjects (i.e., EMF Objects 36) at runtime. Accordingly, the inputs to the mediator generation utility 10 may comprise the names of one or more source ecores 14 and one or more EMap files 12.

The following is a simplified version of an example source ecore 14 entitled "CustomerData.ecore":

```
<?xml version="1.0" encoding="UTF-8"?>
<ecore:EPackage name="CustomerData" xmi:version="2.0"
    xmlns:xmi="http://www.omg.org/XMI"
    xmlns:xsi="http://www.w3.org/2001/XMLSchema-instance"
    xmlns:ecore="http://www.eclipse.org/emf/2002/Ecore"
    nsURI="http://com/ibm/odyssey/test/imc.ecore">
<eClassifiers xsi:type="ecore:EClass" name="User">
    <eStructuralFeatures xsi:type="ecore:EAttribute" name="userId"
eType="ecore:EDataType http://www.eclipse.org/emf/2002/
Ecore#//EString"/>
    <eStructuralFeatures xsi:type="ecore:EAttribute" name="lastName"
eType="ecore:EDataType http://www.eclipse.org/emf/2002/
Ecore#//EString"/>
    <eStructuralFeatures xsi:type="ecore:EReference" name="portfolios"
eType="#//Portfolio" upperBound="-1"/>
    </eClassifiers>
    <eClassifiers xsi:type="ecore:EClass" name="Portfolio">
        <eStructuralFeatures xsi:type="ecore:EAttribute" name="name"
eType="ecore:EDataType http://www.eclipse.org/emf/2002/
Ecore#//EString"/>
        <eStructuralFeatures xsi:type="ecore:EReference" name="owner"
eType="#//User" lowerBound="1"/>
        <eStructuralFeatures xsi:type="ecore:EReference" name="positions"
eType="#//Position" upperBound="-1"/>
    </eClassifiers>
    <eClassifiers xsi:type="ecore:EClass" name="Position">
        <eStructuralFeatures xsi:type="ecore:EAttribute" name="symbol"
eType="ecore:EDataType http://www.eclipse.org/emf/2002/
Ecore#//EString"/>
        <eStructuralFeatures xsi:type="ecore:EAttribute"
            name="currentPrice"
eType="ecore:EDataType http://www.eclipse.org/emf/2002/
Ecore#//EFloat"/>
        <eStructuralFeatures xsi:type="ecore:EAttribute" name="quantity"
eType="ecore:EDataType http://www.eclipse.org/emf/2002/
Ecore#//EInt"/>
        <eStructuralFeatures xsi:type="ecore:EReference" name="portfolio"
eType="#//Portfolio" transient="true" lowerBound="1"/>
        <eStructuralFeatures xsi:type="ecore:EReference" name="stock"
eType="#//Stock" transient="true" lowerBound="1"/>
    </eClassifiers>
    .......
</ecore:EPackage>
```

Figure 3:
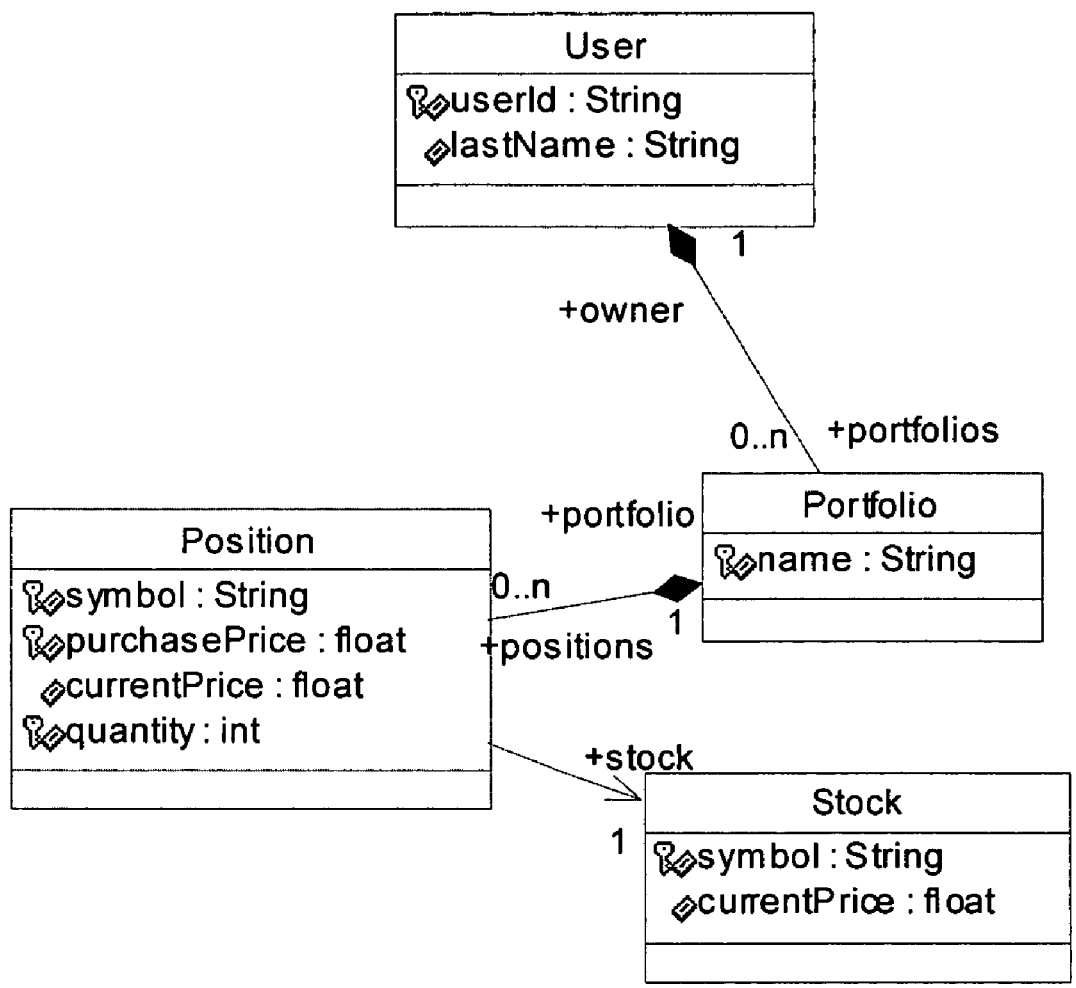
FIG. 3 depicts a UML diagram of a sample ecore.

The UML Class diagram of the above ecore model is depicted in FIG. 3. In this example, CustomerData.ecore does not specify accessor methods for an EClassifier's EStructuralFeatures (eAttributes and eReferences). It is assumed that these EClassifier's are EMF's EClasses having the name specified in the source ecore 14, and that the eAttributes and eReferences are EStructuralFeatures contained within the EClass. The EMap file 12 is used to specify the java application class-names for the EClassifiers (attribute name "app_class") and the correct accessor methods for attributes and references (attribute name "get" and "set" if appropriate) contained within each EClassifier. If a property does not have a setter, then the property is considered read-only. The mediator generation utility 10 uses this information to generate Mediators 34 and DiffHandlers 35 that will know how to access the values of attributes and references given an instance of the java class specified in the EMap file 12.

The following is the EMap file 12 in XML for the above portfolio example ("portfolio.emap"):

```
<mappings xmlns="http://www.w3.org/2001/XMLSchema-instance"
    schemaLocation="mappings.xsd">
    <EPackage name="CustomerData">
    <EClassMap eclass_name="User"
app_class="com.ibm.odcb.tutorial.businessobjects.User" >
        <EFeatureMap efeature_name="refNum" get="getRefNum( )"
set="setRefNum(__SET__OBJ__)" iD="true" />
        <EFeatureMap efeature_name="lastName" get="getLastName( )"
set="setLastName(__SET__OBJ__)" />
        <EFeatureMap efeature_name="portfolios" get="getPortfolios( )"
set="setPortfolios(__SET__OBJ__)" />
    </EClassMap>
    <EClassMap eclass_name="Portfolio"
app_class="com.ibm.odcb.tutorial.businessobjects.Portfolio" >
        <EFeatureMap efeature_name="owner" get="getOwner( )"
set="setOwner(__SET__OBJ__)" iD="true" />
        <EFeatureMap efeature_name="name" get="getName( )"
set="setName(__SET__OBJ__)" iD="true" />
        <EFeatureMap efeature_name="positions" get="getPositions( )"
set="setPositions(__SET__OBJ__)" />
    </EClassMap>
    <EClassMap eclass_name="Position"
app_class="com.ibm.odcb.tutorial.businessobjects.Position" >
        <EFeatureMap efeature_name="portfolio" get="getPortfolio( )"
set="setPortfolio(__SET__OBJ__)" />
        <EFeatureMap efeature_name="stock" get="getStock( )"
set="setStock(__SET__OBJ__)" />
        <EFeatureMap efeature_name="symbol" get="this.getStock( ).
            getSymbol( )" />
        <EFeatureMap efeature_name="quantity" get="getQuantity( )"
set="setQuantity(__SET__OBJ__)" />
        <EFeatureMap efeature_name="purchasePrice"
            get="getPurchasePrice( )"
                set="setPurchasePrice(__SET__OBJ__)" />
        <CalculateAttribute attribute_name="gains"
            expression="(this.getStock( ).getCurrentPrice( )–
this.getPurchasePrice( ))*this.getQuantity( )"
            type="double"/>
    </EClassMap>
    <EClassMap eclass_name="Stock"
app_class="com.ibm.odcb.tutorial.businessobjects.Stock" >
        <EFeatureMap efeature_name="symbol" get="getSymbol( )"
            iD="true" />
        <EFeatureMap efeature_name="currentPrice"
            get="getCurrentPrice( )"
                set="setCurrentPrice(__SET__OBJ__)" />
    </EClassMap>
    </EPackage>
...
</mappings>
```

As noted, EMap file 12 may contain mappings 18 for one or more ecore:EPackages. Note that the attribute "name" in the "EPackage" tag in the EMap file 12 must match the value of the "name" attribute of the "ecore:EPackage" tag of the source ecore 14. The "EClassMap" tag is used for mapping the eClassifiers in the original EPackage to the corresponding eClassifier in the target EPackage. The attribute "eclass_name" must match the value of the original ecore's eClassifier's "name" attribute. The attribute "app_class" must contain the fully qualified name of the non-EMF java class. The "EFeatureMap" tag is used to map the source eClassifier's EStructural Features (eAttributes and or eReferences) to the target eClassifier's EStructuralFeatures (eAttributes and eReferences). The attribute "efeature_name" must match the value of the "name" attribute of the original eStructuralFeature. The attribute "get" must specify the accessor method to be used to obtain the value of this attribute or reference at runtime. As can be seen, portfolio.emap has effectively mapped the non-EMF java classes to the original CustomerData.ecore meta-model (i.e., source ecore).

As also noted above, an additional capability in the EMap file 12 is the ability to specify calculated attributes 20 (element "CalculateAttribute"), which are neither part of the original java class nor the ecore meta-model. The developer can specify an expression (attribute "expression") to be evaluated at runtime. This attribute will show up as an eAttribute in the resulting EObject. This provides the developer more functionality, and potentially eliminates duplicate code in the application elsewhere.

Since these calculated attributes are not part of the source ecore 12, the target ecore 32 needs to be generated to also contain these calculated attributes as eStructuralFeatures of the parent EClassifier. This process is handled by calculated attribute processing system 13. The SDOs generated at runtime will be based on this target ecore 32 so that any additional functionality added to the resulting SDOs via the EMap file 12, such as, the calculated attributes, will be available in the SDO instance. In addition to the inputted EMap file 12 and the source ecore 14, the target ecore 32 is generated using the ecore schema 19.

The EMap file 12 also allows sub-setting and renaming of the source ecore 14. For example, the application may not wish to expose all of the properties of the input classes to the target EMF system for security purposes. Since only those properties specified in the EMap are mapped to the target EMF Object, sub-setting is done seamlessly. In addition, the application may wish to rename some of the classes in the target EMF system for various reasons, this is also easily done by using the Emap's "export" attribute. Currently, EMF has a limitation in defining primary key attributes for a given model in that only one eStructuralFeature can be defined as a primary key per eClassifier to uniquely identify it. This limits the use of primary keys that are a combination of two or more eStructuralFeatures. EMap file 12 is extended to provide a way to indicate combination primary keys by the use of the "iD" attribute 21. iD attribute processing system 23 is provided to process these statements. These extensions are included in the EMap schema 15 given below.

```
<xsd:schema
    targetNamespace="http://www.ibm.com/odyssey/mappings"
    xmlns:xsi="http://www.w3.org/2001/XMLSchema-Instance"
    xmlns:xsd="http://www.w3.org/2001/XMLSchema"
    xmlns="http://www.ibm.com/odyssey/mappings" >
  <xsd:annotation>
   <xsd:documentation xml:lang="en">
      Schema for ecore mapping file (example: portfolio.map) used
      for generating certain SDOMediators and DiffHandlers.
   </xsd:documentation>
  </xsd:annotation>
<xsd:element name="mappings" type="mappingsType"/>
<xsd:complexType name="mappingsType">
   <xsd:sequence>
      <xsd:element name="EPackage" type="EPackageType"
         minOccurs="1"
maxOccurs="unbounded"/>
   </xsd:sequence>
</xsd:complexType>
<xsd:complexType name="EPackageType">
   <xsd:sequence>
      <xsd:element name="EClassMap" type="EClassMapType"
         minOccurs="1"
maxOccurs="unbounded"/>
   </xsd:sequence>
   <xsd:attribute name="name" type="xsd:string" use="required"/>
</xsd:complexType>
```

-continued

```
<xsd:complexType name="EClassMapType">
   <xsd:sequence>
      <xsd:element name="EFeatureMap" type="EFeatureMapType"
         minOccurs="1"
maxOccurs="unbounded"/>
      <xsd:element name="CalculateAttribute"
type="CalculateAttributeType"
minOccurs="0" maxOccurs="unbounded"/>
   </xsd:sequence>
   <xsd:attribute name="app_class" type="xsd:string" use="required"/>
   <xsd:attribute name="eclass_name" type="xsd:string"
      use="required"/>
   <xsd:attribute name="diffgram_on_refresh" type="xsd:boolean"
      use="optional"/>
<xsd: attribute name="export" type="xsd:string" use="optional"/>
</xsd:complexType>
<xsd:complexType name="EFeatureMapType">
   <xsd:attribute name="efeature_name" type="xsd:string"
      use="optional"/>
   <xsd:attribute name="iD" type="xsd:boolean" use="optional"/>
   <xsd:attribute name="get" type="xsd:string" use="required"/>
   <xsd:attribute name="set" type="xsd:string" use="optional"/>
   <xsd:attribute name="export" type="xsd:string" use="required"/>
</xsd:complexType>
<xsd:complexType name="CalculateAttributeType">
   <xsd:attribute name="attribute_name" type="xsd:string"
      use="required"/>
   <xsd:attribute name="iD" type="xsd:boolean" use="optional"/>
   <xsd:attribute name="export" type="xsd:string" use="required"/>
   <xsd:attribute name="expression" type="xsd:string"
      use="required"/>
   <xsd:attribute name="type" type="xsd:string" use="required"/>
</xsd:complexType>
</xsd:schema>
```

In summary, the mediator generation utility 10 uses the source ecore 14 and the input EMap file 12 to programmatically generate Mediators 34 and DiffHandlers 35 in Java that take an instance of a non-EMF Java Class specified in the EMap file 12 and convert it to its equivalent EMF EObject at runtime. Accordingly, a simplified process of converting non-EMF Java Classes into EMF/SDO/WDO objects is provided.

Figure 2:
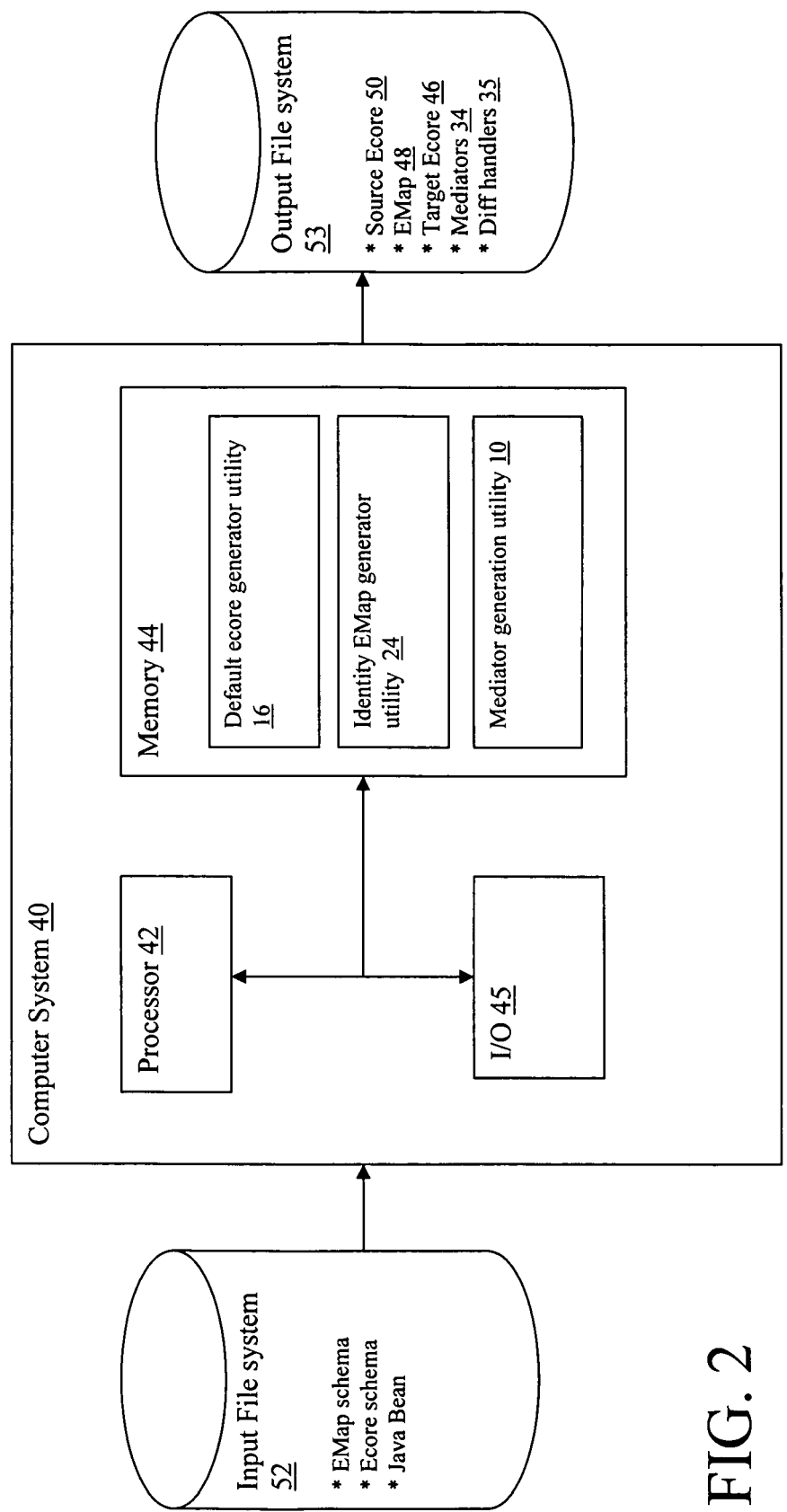
FIG. 2 depicts a computer system for implementing the EMAP generator utility and mediator generation utility described in FIG. 1.

Referring now to FIG. 2, a computer system 40 is shown suitable for implementing the utilities described above. In general, computer system 40 may comprise, e.g., a desktop, a laptop, a workstation, etc. Moreover, computer system 40 could be implemented as part of a client and/or a server. Computer system 40 generally includes a processor 42, memory 44, a bus, and input/output (I/O) 45. The processor 42 may comprise a single processing unit, or be distributed across one or more processing units in one or more locations, e.g., on a client and server. Memory 44 may comprise any known type of data storage and/or transmission media, including magnetic media, optical media, random access memory (RAM), read-only memory (ROM), a data cache, a data object, etc. Moreover, any memory 44 may reside at a single physical location, comprising one or more types of data storage, or be distributed across a plurality of physical systems in various forms.

As shown in FIG. 2, memory 44 includes the mediator generation utility 10 that generates the target ecore 46, the identity EMap generation utility 24 for generating an identity EMap 48, and the default ecore generation utility 16 that generates a default source ecore 50. These utilities may use various files made available on input file system 52.

I/O 45 may comprise any system for exchanging information to/from an external resource, such as input file system 52 and output file system 53. External devices/resources may comprise any known type of external device, including speakers, a CRT, LED screen, hand-held device, keyboard, mouse, voice recognition system, speech output system, printer, monitor/display, facsimile, pager, etc. A bus may be included to provide a communication link between each of the components in the computer system 40 and likewise may comprise any known type of transmission link, including electrical, optical, wireless, etc. Although not shown, additional components, such as cache memory, communication systems, system software, etc., may be incorporated into computer system 40.

File systems 52, 53 may be embodied in any type of storage system (e.g., a relational database, etc.) and may include one or more storage devices, such as RAM, ROM, a magnetic disk drive and/or an optical disk drive. Data storage can also be distributed across, for example, a local area network (LAN), wide area network (WAN) or a storage area network (SAN) (not shown). Thus, file systems 52, 53 could have some or all of their data stored remotely over a distributed network, thereby allowing for the pooling of resources and information.

The computer could be implemented as part of a network such as the Internet, a local area network (LAN), a wide area network (WAN), a virtual private network (VPN), etc. Communication could occur via a direct hardwired connection (e.g., serial port), or via an addressable connection that may utilize any combination of wireline and/or wireless transmission methods. Moreover, conventional network connectivity, such as Token Ring, Ethernet, WiFi or other conventional communications standards could be used. Still yet, connectivity could be provided by conventional TCP/IP sockets-based protocol. In this instance, an Internet service provider could be used to establish interconnectivity. Further, as indicated above, communication could occur in a client-server or server-server environment.

It should be appreciated that the teachings of the present invention could be offered as a business method on a subscription or fee basis. For example, computer system 40 comprising the utilities described herein could be created, maintained and/or deployed by a service provider that offers the functions described herein for customers.

It is understood that the systems, functions, mechanisms, methods, engines and modules described herein can be implemented in hardware, software, or a combination of hardware and software. They may be implemented by any type of computer system or other apparatus adapted for carrying out the methods described herein. A typical combination of hardware and software could be a general-purpose computer system with a computer program that, when loaded and executed, controls the computer system such that it carries out the methods described herein. Alternatively, a specific use computer, containing specialized hardware for carrying out one or more of the functional tasks of the invention could be utilized. In a further embodiment, part of all of the invention could be implemented in a distributed manner, e.g., over a network such as the Internet.

The present invention can also be embedded in a computer program product, which comprises all the features enabling the implementation of the methods and functions described herein, and which—when loaded in a computer system—is able to carry out these methods and functions. Terms such as computer program, software program, program, program product, software, etc., in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The foregoing description of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of this invention as defined by the accompanying claims.

The invention claimed is:

1. A system for generating a target meta model file that can convert non-EMF (Eclipse Modeling Framework) objects to EMF-based objects in an EMF-based runtime environment, comprising:
   a system for inputting a source meta model that describes a data model and runtime support for the data model;
   a system for inputting an EMap file that maps non-EMF java classes to the source meta model;
   an association mechanism that utilizes the Emap file to associate eClassifiers in the source meta model to non-EMF Java classes in the source meta model;
   a system for generating a default source meta model based on a Java Bean;
   a system for generating an identity EMap based on an EMap schema;
   a system for processing calculated attributes in the EMap file in order to create an expression that will be evaluated at runtime, wherein the system for processing calculated attributes generates attributes in the target meta model as eStructuralFeatures of a parent EClassifier; and
   a system for processing iD attributes in the EMap file in order to allow use of combination primary keys.

2. A computer storage medium having a program product stored thereon for generating a target meta model file that can convert non-EMF (Eclipse Modeling Framework) objects to EMF-based objects in an EMF-based runtime environment, comprising:
   program code configured for inputting a source meta model that describes a data model and runtime support for the data model;
   program code configured for inputting an EMap file that maps non-EMF java classes to the source meta model;
   program code configured for utilizing the Emap file to associate eClassifiers in the source meta model to non-EMF Java classes in the source meta model;
   program code configured for generating a default source meta model based on a Java Bean;
   program code configured for generating an identity EMap based on an EMap schema;
   program code configured for processing calculated attributes in the EMap file in order to create an expression that will be evaluated at runtime, wherein the program code configured for processing calculated attributes generates attributes in the target meta model as eStructuralFeatures of a parent EClassifier; and
   program code configured for processing iD attributes in the EMap file in order to allow use of combination primary keys.

3. A method for generating a target meta model file that can convert non-EMF (Eclipse Modeling Framework) objects to EMF-based objects in an EMF-based runtime environment, comprising:
   inputting a source meta model that describes a data model and runtime support for the data model;
   inputting an EMap file that maps non-EMF java classes to the source meta model;

utilizing the Emap file to associate eClassifiers in the source meta model to non-EMF Java classes in the source meta model;

generating a default source meta model based on a Java Bean;

generating an identity EMap based on an EMap schema;

processing calculated attributes in the EMap file in order to create an expression that will be evaluated at runtime;

processing calculated attributes generates attributes in the target meta model as eStructuralFeatures of a parent EClassifier; and processing iD attributes in the EMap file in order to allow use of combination primary keys.

* * * * *